A. A. WHITLEY.
CLIP FOR USE IN STENTERING MACHINES.
APPLICATION FILED JAN. 18, 1910.
1,050,755. Patented Jan. 14, 1913.
8 SHEETS—SHEET 1.
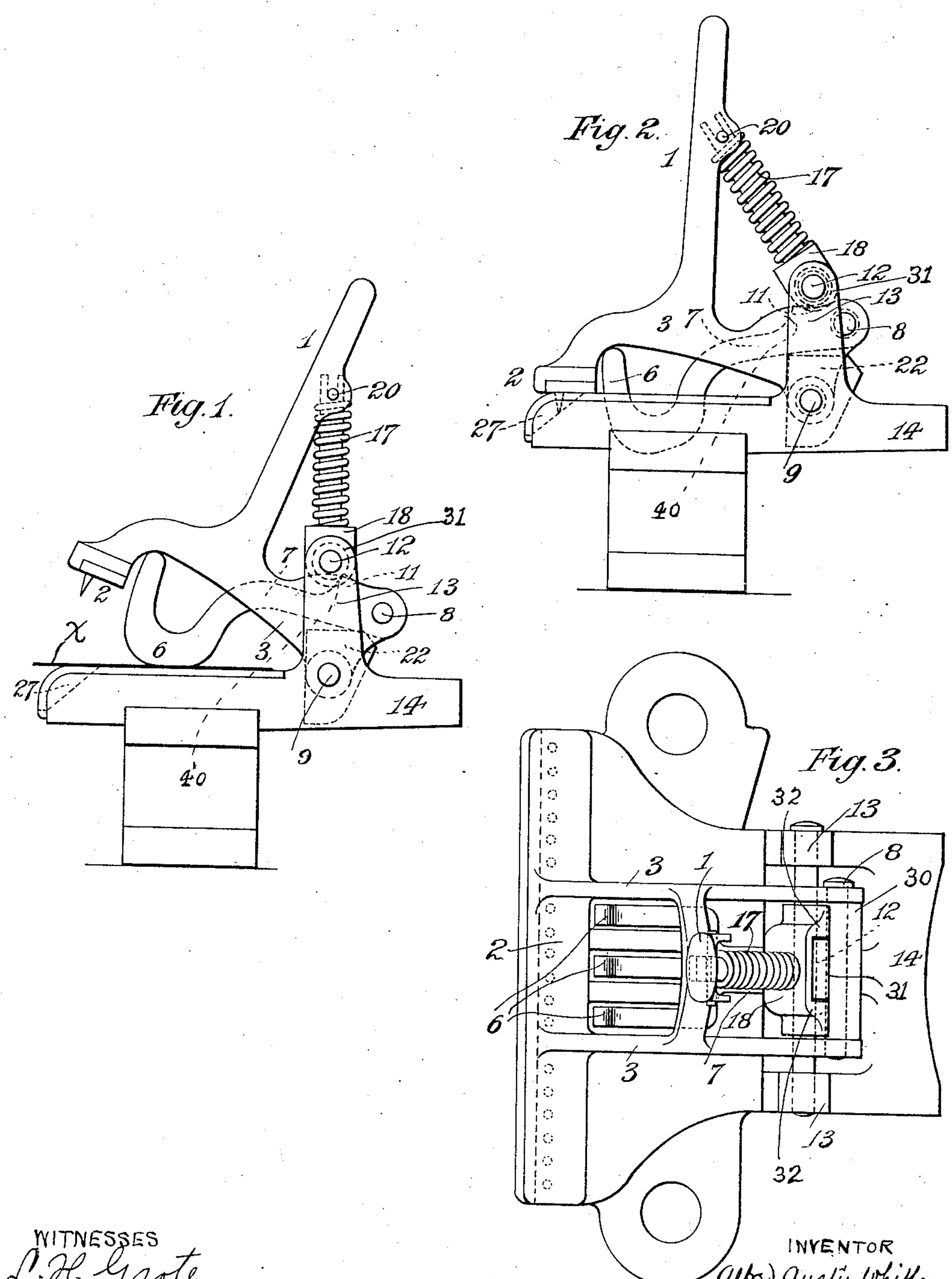
WITNESSES
L. H. Grote
M. E. Keir
INVENTOR
Alfred Austin Whitley
BY
Howson and Howson
his ATTORNEYS
COLUMBIA PLANOGRAPH CO., WASHINGTON, D. C.

A. A. WHITLEY.
CLIP FOR USE IN STENTERING MACHINES.
APPLICATION FILED JAN. 18, 1910.
1,050,755. Patented Jan. 14, 1913.
8 SHEETS—SHEET 2.
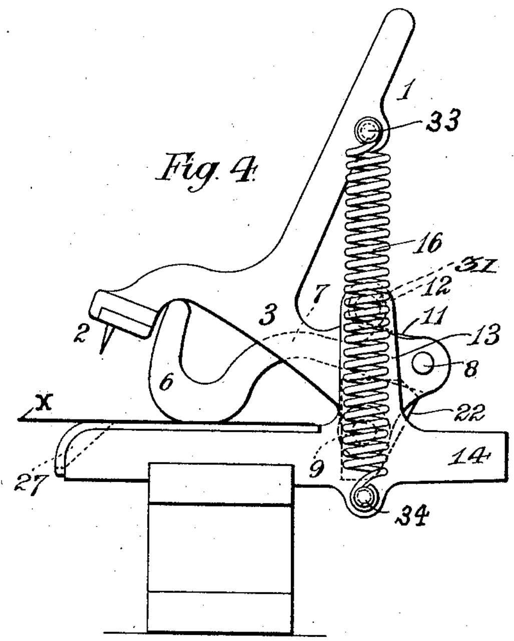
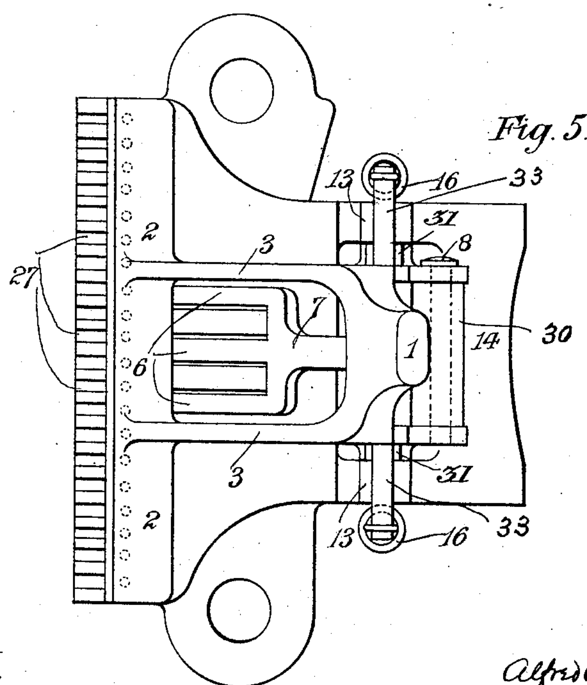
WITNESSES
L. H. Grote
M. E. Keir
INVENTOR
Alfred Austin Whitley
BY
Howson and Howson
his ATTORNEYS
COLUMBIA PLANOGRAPH CO., WASHINGTON, D. C.

A. A. WHITLEY.
CLIP FOR USE IN STENTERING MACHINES.
APPLICATION FILED JAN. 18, 1910.
1,050,755.
Patented Jan. 14, 1913.
8 SHEETS—SHEET 3.
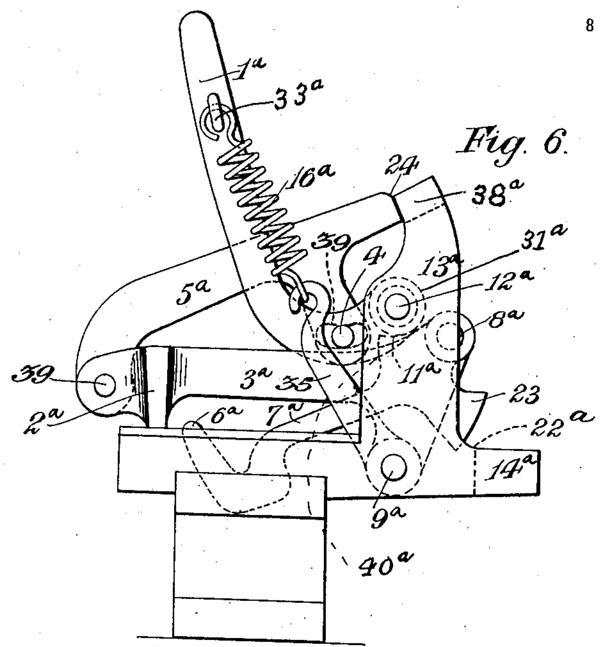
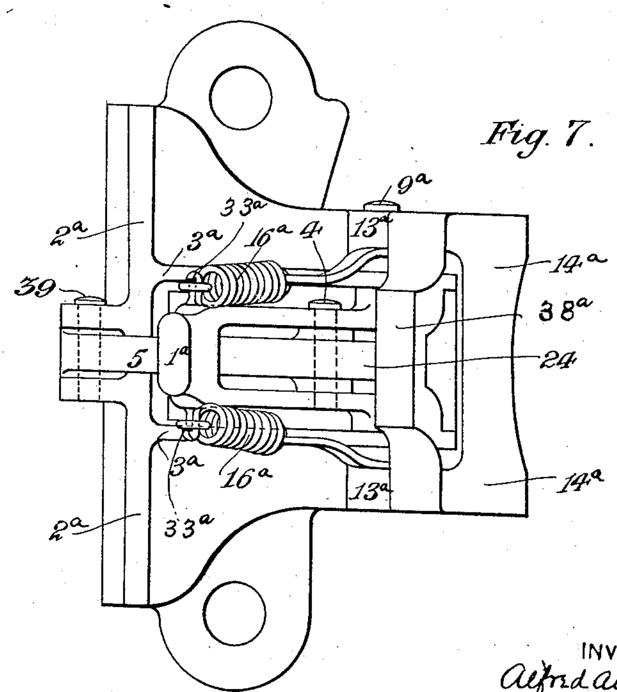
WITNESSES
L. H. Grote
W. E. Keir
INVENTOR
Alfred Austin Whitley
BY
Howson and Howson
his ATTORNEYS
COLUMBIA PLANOGRAPH CO., WASHINGTON, D. C.

A. A. WHITLEY.
CLIP FOR USE IN STENTERING MACHINES.
APPLICATION FILED JAN. 18, 1910.
1,050,755. Patented Jan. 14, 1913.
8 SHEETS—SHEET 4.
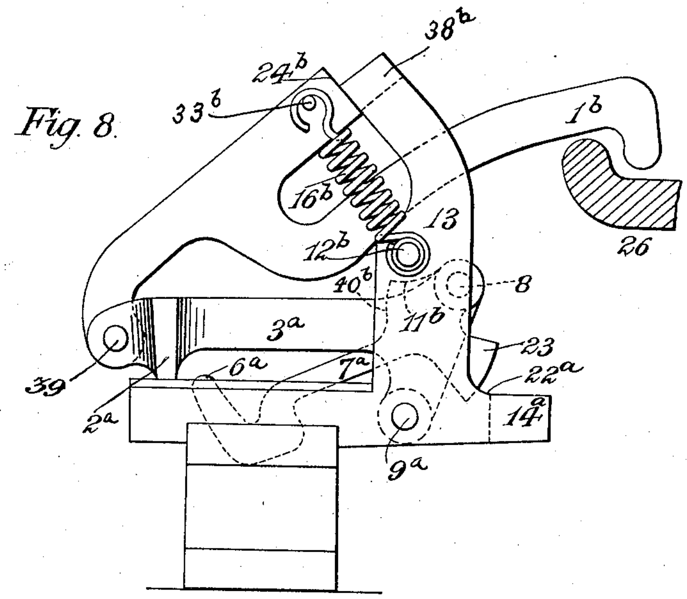
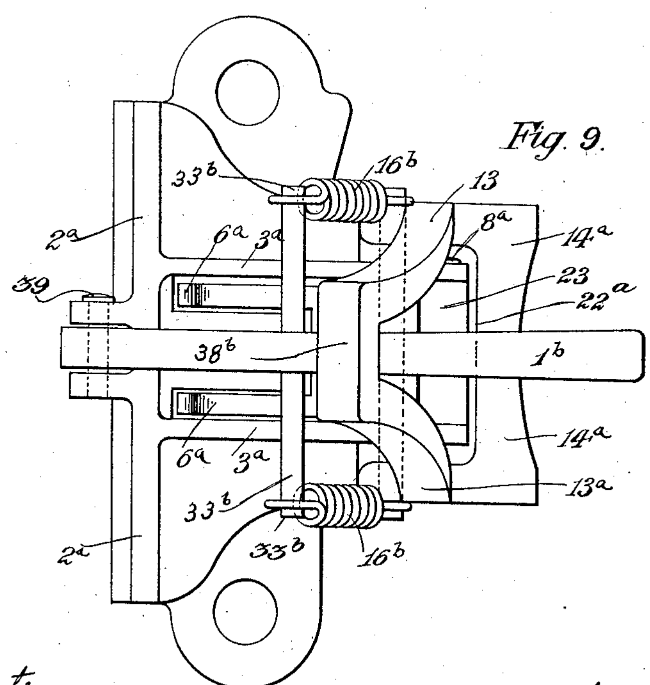
WITNESSES
L. H. Grote
W. E. Keir
INVENTOR
Alfred Austin Whitley
BY
Howson and Howson
his ATTORNEYS
COLUMBIA PLANOGRAPH CO., WASHINGTON, D. C.

A. A. WHITLEY.
CLIP FOR USE IN STENTERING MACHINES.
APPLICATION FILED JAN. 18, 1910.
1,050,755. Patented Jan. 14, 1913.
8 SHEETS—SHEET 5.
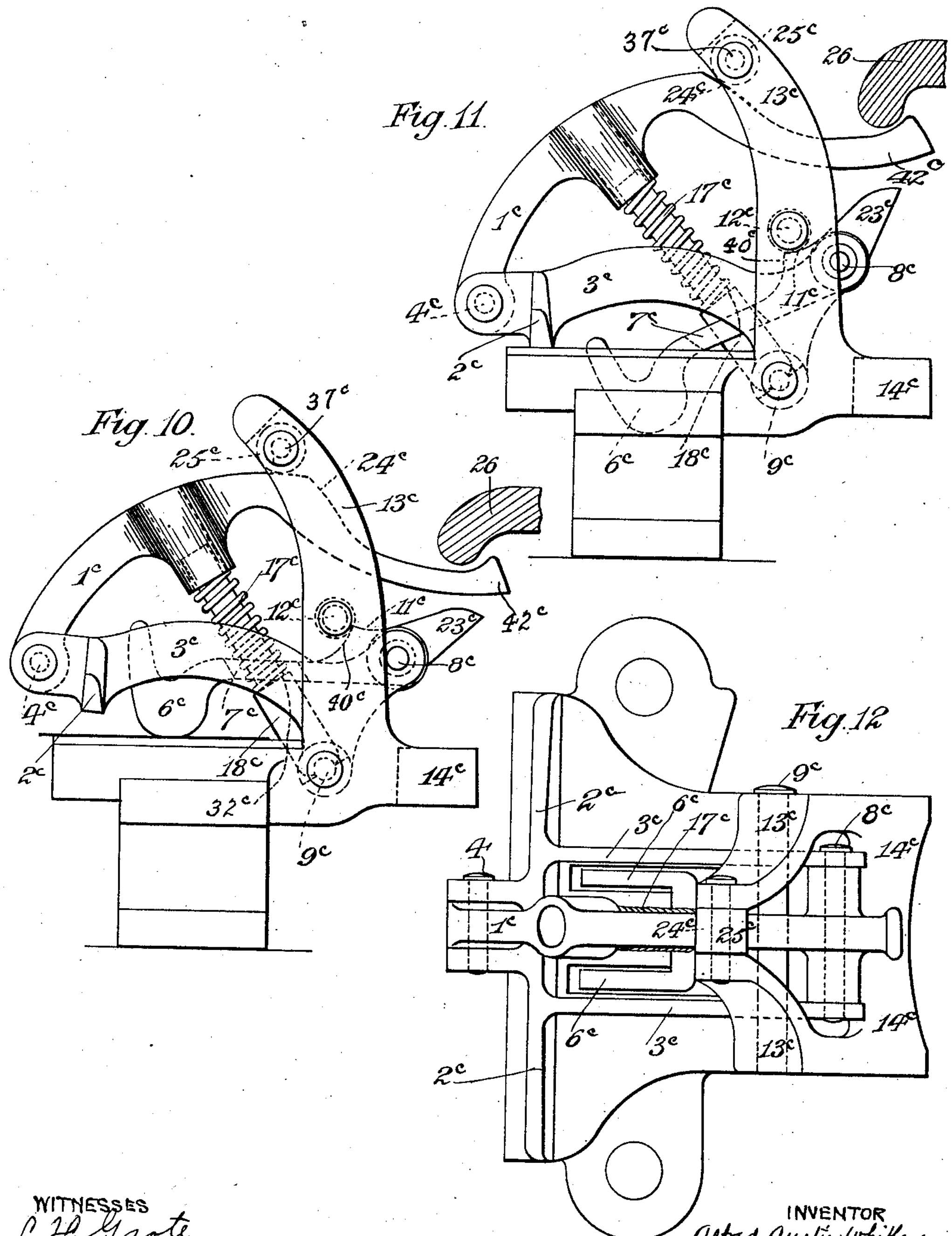
WITNESSES
L. H. Grote
W. E. Kerr
INVENTOR
Alfred Austin Whitley
BY
Howson and Howson
his ATTORNEYS
COLUMBIA PLANOGRAPH CO., WASHINGTON, D. C.

A. A. WHITLEY.
CLIP FOR USE IN STENTERING MACHINES.
APPLICATION FILED JAN. 18, 1910.
1,050,755. Patented Jan. 14, 1913.
8 SHEETS—SHEET 6.
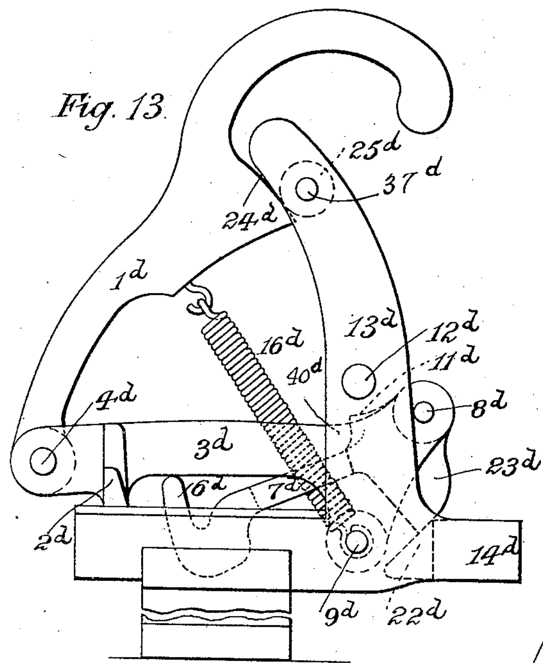
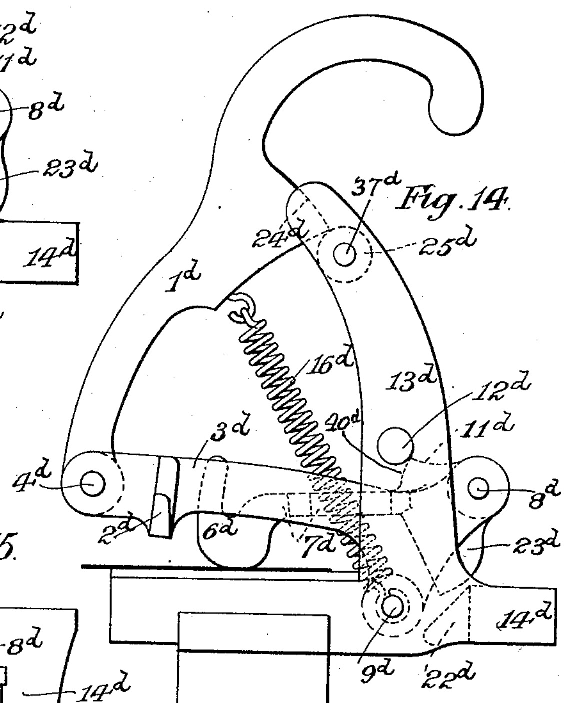
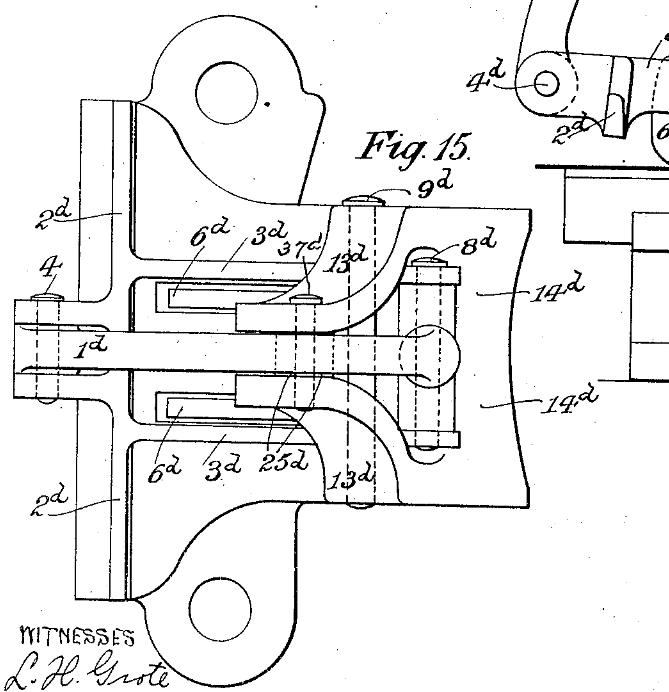
WITNESSES
L. H. Grote
M. E. Klein
INVENTOR
Alfred Austin Whitley
BY
Howson and Howson
his ATTORNEYS A. A. WHITLEY.
CLIP FOR USE IN STENTERING MACHINES.
APPLICATION FILED JAN. 18, 1910.
1,050,755.
Patented Jan. 14, 1913.
8 SHEETS—SHEET 7.
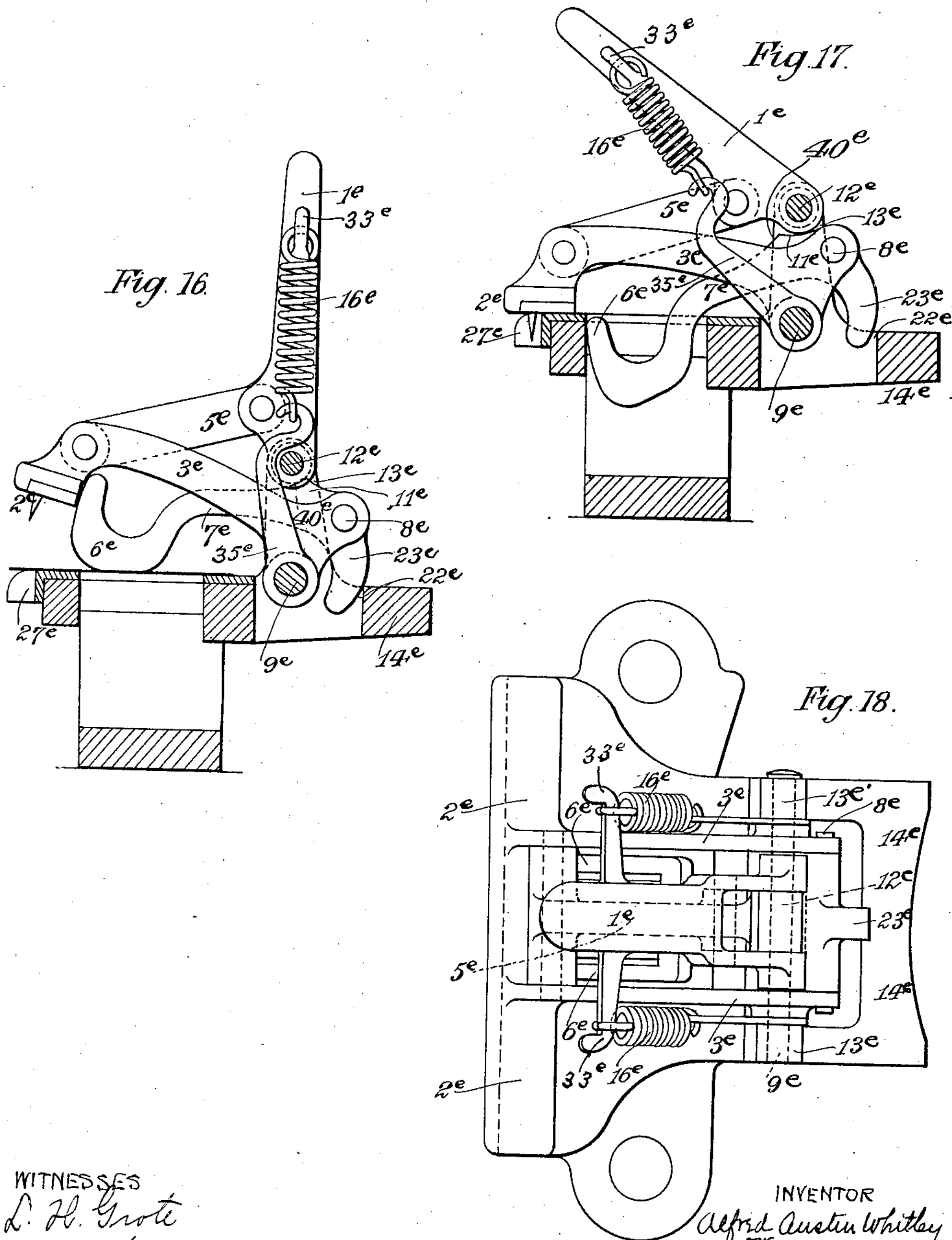
WITNESSES
L. H. Grote
W. E. Kiis
INVENTOR
Alfred Austin Whitley
BY
Howson and Howson
his ATTORNEYS A. A. WHITLEY.
CLIP FOR USE IN STENTERING MACHINES.
APPLICATION FILED JAN. 18, 1910.
1,050,755.
Patented Jan. 14, 1913.
8 SHEETS—SHEET 8.
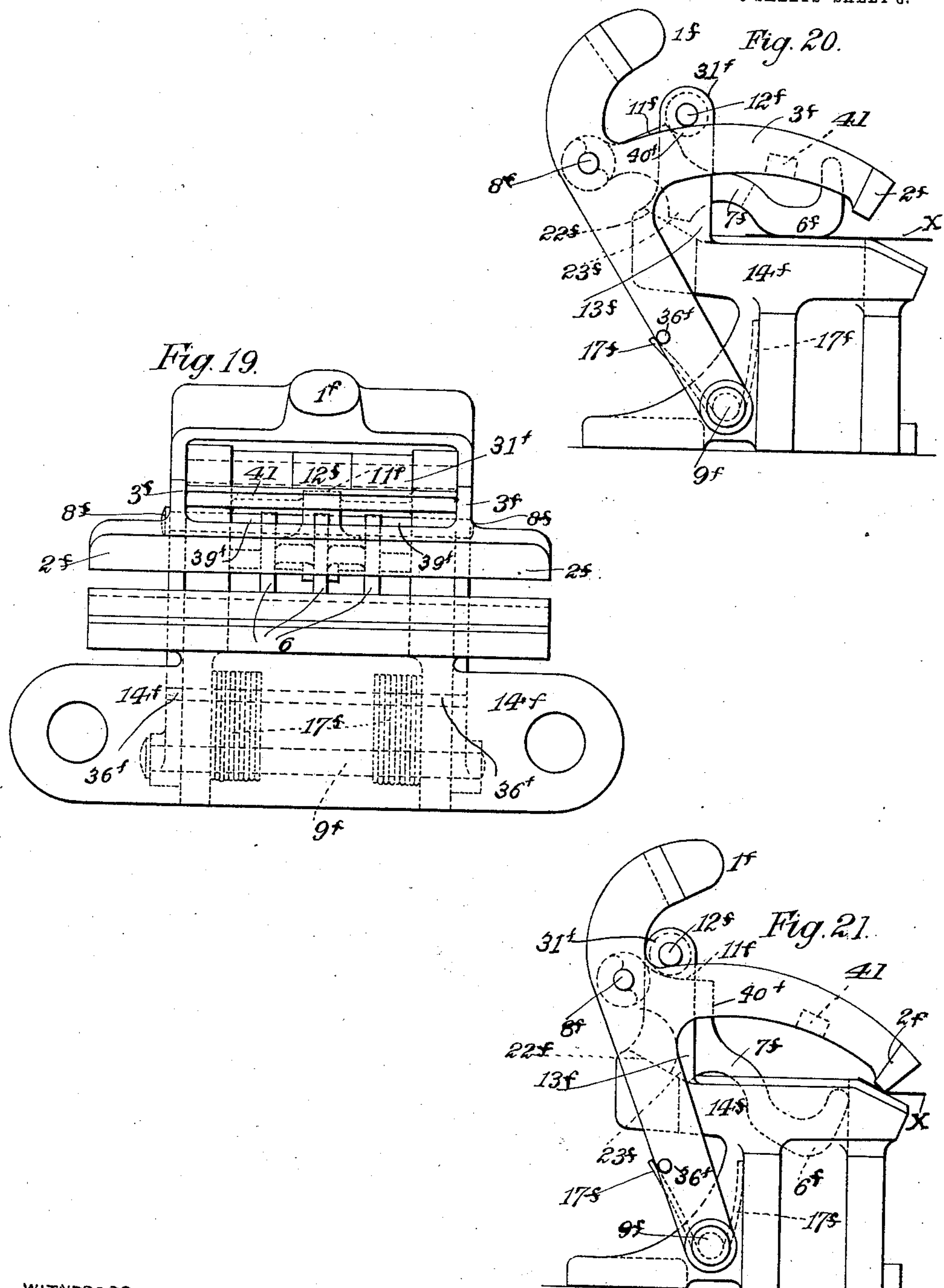
WITNESSES
L. H. Grote
M. E. Keir
INVENTOR
Alfred Austin Whitley
BY
Howson and Howson
his ATTORNEYS

UNITED STATES PATENT OFFICE.

ALFRED AUSTIN WHITLEY, OF EAST VIEW, BURY, ENGLAND.

CLIP FOR USE IN STENTERING-MACHINES.

1,050,755. Specification of Letters Patent. Patented Jan. 14, 1913.

Application filed January 18, 1910. Serial No. 538,638.

*To all whom it may concern:*

Be it known that I, ALFRED AUSTIN WHITLEY, a subject of the King of Great Britain and Ireland, of East View, Higher Lane, Whitefield, Bury, in the county of Lancaster, England, engineer, have invented new and useful Improvements in Clips for Use in Stentering-Machines, of which the following is a specification.

My invention has for its object to provide improved clips for use in stentering machines, the clips being of the kind, wherein the lever of the gage-tongue or finger has a rearward movement when the opening lever is operated.

In describing my invention I will refer to the accompanying drawings, which represent constructions of clips in accordance with my invention, and in which that side of the clip at which the cloth enters is referred to as the "inner side," the opposite side of the clip being referred to as the "outer side" of the clip.

Figures 1 and 2 are side elevations, and Fig. 3 is a plan of a clip with the upper jaw open in Fig. 1, and closed in Figs. 2 and 3, the opening lever being formed in one with the upper jaw lever; Fig. 4 shows in elevation and Fig. 5 in plan, a similar clip but with a tension spring device instead of a compression spring device, the upper jaw being shown open; Fig. 6 shows in elevation and Fig. 7 in plan, a modification, in which the opening lever is centered to the body part of the clip, and connected by a link with the upper jaw lever, the upper jaw being shown closed; Fig. 8 shows in elevation, and Fig. 9 in plan, a modification with the opening lever and a wedging piece formed in one and jointed directly to the upper jaw lever, the said jaw being shown closed; Figs. 10 and 11 show in elevation, and Fig. 12 in plan, a modification of the clip, Fig. 10 showing the upper jaw open, and Figs. 11 and 12 showing it closed, in which modification the opening cam acts from above instead of from below as in Figs. 8 and 9, and in which a compression spring device is used, instead of a tension spring device; Figs. 13 and 14 show, in elevation (with the upper jaw closed and open respectively) and Fig. 15 in plan, a modified form of the clip Figs. 8 and 9, the upper jaw being shown closed in Figs. 13 and 15, and open in Fig. 14; Figs. 16 and 17 show, in elevation, and Fig. 18 in plan, a modified form of the clip, Figs. 6 and 7, with the upper jaw open in Fig. 16 and closed in Figs. 17 and 18; Figs. 19 and 20 show, in elevations at right angles to each other (with the upper jaw open) a clip generally resembling that shown in Figs. 1, 2, 3, 4 and 5, but arranged to suit a machine in which the chain wheels are arranged vertically; Fig. 21 is a side view like Fig. 20, but with the upper jaw closed.

In Figs. 1, 2, 3, 4 and 5 corresponding parts are marked with the same reference numerals, these however, being further provided with a different index letter in the remaining figures to designate corresponding parts in the various modifications.

Referring to the drawings, Figs. 1, 2 and 3 illustrate a typical form of clip constructed in accordance with my invention. In this construction the opening lever 1 is formed in one with the side-arms 3 carrying the upper jaw 2, the outer ends of the said side-arms being hinged on the pin 8, and held apart by the distance piece 30 which is formed as a boss on the outer end of the lever 7 of the gage-tongue 6. The gage-tongue 6, carried by the lever 7, is hinged on the pin 8 and the lever 7 is provided with an inclined or curved projection 11, the acting surface 40 of which is substantially concentric with the hinge-pin 8, this latter being situated to the right of the center-pin 9 upon which the upper jaw turns. The projection 11 is arranged to bear against a roller 31 carried on the pin 12 which is supported by the arms 13 projecting from the link, body-part or framing hereinafter referred to as the framing 14 of the clip. Between the upper jaw lever arms 3 and loosely supported on the pin 12 is a bridge-piece or abutment 18, between the jaws 32 of which is situated the aforesaid roller 31. This bridge-piece is capable of turning on the center-pin 12, and is arranged to support a compression spring 17, one end of which bears on the abutment 18, the other end of the said compression spring bearing against the pin 20 supported by projections from the opening lever 1.

Within the framing 14 of the clip and in the path in which the lever 7 of the gage-tongue 6 moves, is an edge, lug or projection hereinafter referred to as abutment 22, which is so arranged that it will allow the gage-tongue 6 to descend when the edge of the fabric $x$ has passed it, but which, when the opening lever 1 is operated to open the clip, will act as an abutment for the said gage-tongue 6 and cause the latter to rise when the clip is opened.

I have shown, in Figs. 1, 2, 3, 4 and 5, clips provided with pin grips, but either plain or pin grips may be used in the several constructions illustrated. I prefer, however when pin grips are used, to make the openings in the lower jaw, through which the pins on the upper jaw pass, in the form of slots as shown at 27, which slots open out at the inner side of the lower jaw for convenience in cleaning. There may be a slot for each pin, or each slot may accommodate several pins. Or, instead of a slotted lower jaw I may use a rubber strip to receive the pins.

In the clip shown in Figs. 4 and 5 the upper jaw 2, carried by the lever arms 3, is acted on (through the opening lever) by tension springs 16, the ends of which are attached respectively to pins 34 on the framing 14 of the clip and to pins 33 projecting from the opening lever 1. This clip, save as aforesaid and without the bridge-piece 32 shown in Figs. 1, 2 and 3 and hereinbefore described, is practically the same as the clip shown in the said Figs. 1, 2 and 3.

The action of the clip illustrated in Figs. 1, 2 and 3 is as follows:—When the clip is closed the parts assume the position shown in Fig. 2 and the clip remains closed until the opening lever is acted on by the usual cam. When the opening lever is so acted on, the upper jaw and gage-tongue are raised and the latter comes to rest on the fabric underneath, as shown in Fig. 1. In this position, the centers 20, 12 and 9 are practically in alinement so that any pressure of the spring 17, tending to close the upper jaw is taken up by the reaction of the pin 20. It will also be seen that nearly the whole weight of the upper jaw is taken up by the reaction of the pin 12 on the surface 40. There thus remains the unbalanced weight of the rear end of the gage-tongue or finger which is partly taken up by the pin 12 and which unbalanced weight when the cloth is removed from underneath the gage-tongue causes the latter to fall, thereby displacing the center 20 out of its alinement with the centers 12 and 9, so allowing the spring 17 to act on the opening lever 1 and force the upper jaw firmly down onto the fabric. When the clip is being opened the upward movement of the gage-tongue, relative to the upward movement of the upper jaw is much quicker because of the action of the abutment 22 on the under surface of the forward end of the gage-tongue. The action of the clip of Figs. 4 and 5 is the same as that of Figs. 1, 2 and 3, except that a tension spring 16 is substituted in Figs. 4 and 5 for the compression spring 17 of Figs. 1, 2 and 3.

The clip may be modified as shown in Figs. 6 and 7 in which the outer end of the lever $7^a$ of the gage-tongue $6^a$ is provided with a snug or projection 23, which, when the opening lever $1^a$ is operated to open the clip, is acted on, by the abutment $22^a$ formed on the framing 14 of the clip in such manner as to cause the gage-tongue 6 to be raised. The opening lever in this clip is formed as shown at $1^a$, and is pivoted at $12^a$ to the arms $13^a$ projecting from the link, body-part or framing $14^a$ of the clip, the upper jaw lever arms $3^a$ and the said opening lever $1^a$ being united by a pin and slot connection 4 carried by a link $5^a$, the inner end of which link $5^a$ is pivotally jointed to the upper jaw $2^a$, at 39. In Figs. 6 and 7 the projections 13 of Figs. 1, 2, 3, 4 and 5, are extended upward as shown at $13^a$ so as to form a bridge $38^a$ which coöperates with the part 24 formed on the outer end of the link $5^a$, in such manner as to wedge the upper jaw firmly on to the fabric when the clip is closed. The tension springs $16^a$ in Figs. 6 and 7 are not directly connected to the framing 14 of the clip as in Figs. 4 and 5, but are attached at their lower ends to hook arms 35 which are pivoted at $9^a$ in the framing 14 of the clip. The upper ends of the said springs $16^a$ are connected to pins $33^a$ projecting from the opening lever $1^a$, $31^a$ is a roller under which the surface $11^a$ slides when the clip is being raised.

In Figs. 8 and 9 I have shown a clip having a projection 23 which coöperates with the abutment $22^a$ on the framing $14^a$ of the clip. The opening lever $1^b$ is pin-jointed at 39 to the side arms $3^a$ which carry the upper jaw $2^a$ and that the opening lever is extended to the outer side of the clip as shown so that the said opening lever is raised to open the clip by the cam 26.

In Figs. 6, 7, 8 and 9 the clip is shown closed. When it is desired to open this clip, the opening lever is operated by the usual cam, thereby raising the upper jaw into a position such that the under face of the part 24 bears on the top of the part $38^a$ or $38^b$. The raising of the upper jaw causes the center 8 upon which the gage-tongue is hinged, to be moved backward until the projection 11 clears the pin 12 on the roller $12^a$ on the pin 12, at which moment the projection 23 on the under face of the gage-tongue comes into contact with the abutment 22. Further upward movement of the upper jaw causes the gage-tongue to be raised, the movement of the latter being accelerated by the action of the parts 23 and 22, this upward or opening movement being continued until the gage-tongue is sufficiently raised to permit of the entry of the fabric underneath it. The opening lever is then released and the gage-tongue comes to rest on the fabric, while any pressure due to the spring 16 which may exist is balanced or practically so by the reaction of the pin 12 on the curved surface of the projection $11^a$ or $11^b$. When, however, the cloth is removed from under the gage-tongue the latter falls and allows the upper jaw to be forced firmly down onto the cloth.

Figs. 10 and 11 show a modified form of the clip shown in Figs. 8 and 9 in which the opening lever $1^c$ is depressed to open the clip. The opening lever in this form of clip is pin-jointed to the upper jaw $2^c$ having a plain grip. When the clip is open and the gage-tongue $6^c$ is bearing on the cloth, as shown in Fig. 10, the opening lever $1^c$ bears on the roller $25^c$, mounted on the pin $37^c$, which is supported by and between the side arms $13^c$, and as the upper jaw $2^c$ begins to move toward the lower jaw, the opening lever $1^c$ slides from under the roller $25^c$, until the grip is effected, at which time the surface $24^c$ bears against the roller $25^c$, and this surface on account of its wedging action forces the upper jaw $2^c$ firmly onto the fabric. In this construction of clip the lever $7^c$ of the gage-tongue $6^c$ is provided, at its outer end and beyond the pivot-pin $8^c$ with a projection $23^c$, which, when the opening lever $1^c$ is depressed by the cam 26 to open the clip, is acted on by the part $42^c$ of the outer end of the opening lever $1^c$.

In the construction shown in Figs. 10, 11 and 12 and when the gage-tongue is resting on the fabric, the pressure of the spring $17^c$ is taken up by the pin $25^a$ and the greater part of the weight of the gage-tongue and the lever 7 is practically balanced by the reaction of pin 12 on the curved surface $40^c$. When the gage-tongue or finger falls, the upper jaw is forced down onto the fabric and securely holds the same. On the opening lever being operated the upper jaw opens and continues to rise until the part $42^c$ comes into contact with the projection $23^c$, and as a result of further rising of the upper jaw, the gage-tongue is also raised, the upward movement of the gage-tongue being accelerated by the combined action of the parts $42^c$ and 23, the gage-tongue or finger being thereby raised to a height sufficient to permit of the entry of the fabric underneath the gage-tongue.

Figs. 13, 14 and 15 show a clip in which the opening lever $1^d$ which is pin-jointed to the upper jaw $2^d$, rides over instead of under the roller $25^d$ when the clip is being opened. The arms $13^d$ projecting upward from the framing $14^d$ of the clip, are bent inward and carry at their upper ends the pin $37^d$ upon which the roller $25^d$ turns. When the grip is effected the upper jaw $2^d$ is forced firmly down onto the fabric by the wedging action of the surface $24^d$ which then bears on the roller $25^d$.

In Figs. 13, 14 and 15 the wedging action of the opening lever $1^d$ is the same as that described with reference to Figs. 10, 11 and 12, except that a tension spring is used in the construction shown in Figs. 13, 14, and 15 for the compression spring of Figs. 10, 11 and 12, and the part $24^d$ of the opening lever rides over the roller $25^d$ instead of under, when the clip is open. Here however the upward movement of the gage tongue is accelerated by the engagement of its cam $23^d$ by the abutment $14^d$ at the outer end of the clip frame, much as in Figs. 6 and 7.

In Figs. 16, 17 and 18 the differentiating features are the provision of a projection $23^e$ on the outer end of the lever $7^e$ of the gage-tongue or finger $6^e$, which projection, in conjunction with the abutment $22^e$ on the framing of the clip acts to raise the gage-tongue or finger when the clip is being opened. In this case the tension springs $16^e$ are connected at their upper ends to pins $33^e$ and at their lower ends to hooks $35^e$ pivoted on the pin $9^e$, carried by the framing 14 of the clip. In this construction the opening lever $1^e$ is mounted on the pivot-pin $12^e$ supported by and between the arms $13^e$ which project from the framing $14^e$ of the clip and the said opening lever $1^e$ is connected to the upper jaw $2^e$ by an intermediate link $5^e$.

The action of the clip illustrated in Figs. 16, 17 and 18 is the same as that described with reference to Figs. 1, 2 and 3, the differences between the clips being purely constructional and consisting first: in the substitution of a tension spring for a compression spring, and secondly in utilizing the framing as the means for accelerating the upward motion of the gage-tongue which is caused to rise by the action of the abutment $22^e$ on the part $23^e$ formed on the under surface of the gage-tongue and thirdly in connecting the opening lever $1^e$ to the upper jaw $2^e$ by a link $5^e$.

Figs 19, 20 and 21 show a clip adapted to be used with a vertical style of chain instead of a horizontal style. In this construction of clip two additional parts are provided in excess of those shown in Figs. 1 to 5. The additional parts are the cross piece 41 which is secured to or formed in one with the side arms $3^f$ and the pin $36^f$ carried by the opening lever $1^f$ and against which pin the spring $17^f$ constantly bears. The cross piece 41 forms an effectual stop which limits the outward travel of the upper jaw $2^f$ and the opening lever $1^f$.

Figs. 19, 20 and 21 show a clip for use with vertical chains. In this construction of clip, when the gage-tongue rests on the cloth, the pressure of the spring and almost the entire weight of the gage-tongue and lever is taken up by the pin $12^f$ or the roller $31^f$. On the removal of the fabric, however, the gage-tongue falls, and the upper jaw is then forced down onto the fabric by the spring. When the opening lever is operated to open the clip, the gage-tongue is drawn toward the outer side of the clip, and when the part $23^f$ on the gage-tongue strikes the abutment $22^f$ the gage-tongue is then, on a further opening movement of the opening lever sufficiently raised to permit of the entry of the fabric underneath it.

I claim as my invention:—

1. A stentering machine clip having an upper jaw lever jointed to the clip frame, a gage tongue jointed to said upper jaw lever and adapted to have a rearward movement when the clip is opened, an abutment rigid with the clip frame adapted to engage said gage tongue on its backward movement and cause the same to be lifted, and spring means for forcing said upper jaw lever firmly down upon the fabric in the closed position of the clip substantially as described.

2. A stentering machine clip having an upper jaw lever and an opening lever jointed thereto, a gage tongue jointed to said upper jaw lever and adapted to have an outward movement on the opening of the clip a bearing rigid with the clip frame, and a wedge surface on the opening lever coöperating with said bearing to force said upper jaw firmly upon the fabric when the clip is closed, substantially as described.

3. A stentering machine clip having an upper jaw lever and an opening lever jointed thereto,, a gage tongue jointed to said upper jaw lever and adapted to have an outward movement on the opening of the clip a bearing rigid with the clip frame, and a spring-pressed wedge surface on the opening lever coöperating with said bearing to force said upper jaw firmly upon the fabric when the clip is closed, substantially as described.

4. A stentering machine clip having an upper jaw lever and an opening lever pivoted thereto, a gage tongue jointed to said upper jaw lever and adapted to have an outward movement on the opening of the clip, a bearing rigid with the clip frame and a spring device tending to keep said opening lever constantly in contact with said abutment, substantially as described.

5. A stentering machine clip having a pivoted upper jaw lever jointed to the clip frame, a gage tongue freely jointed to said upper jaw lever and having a backward movement when the clip is opening, and means operative during the opening of the jaw lever, for lifting the gage tongue, and spring means for forcing said upper jaw lever firmly down upon the fabric in the closed position of the clip for the purpose described.

6. A stentering machine clip having an upper jaw lever, a gage tongue jointed thereto and adapted to have an outward movement when the clip is opened, a cam on said gage tongue lying below the level of its joint with the upper jaw lever, and an abutment rigid with the clip frame and engaging said cam portion of the gage tongue on its outward movement to cause the tongue to be lifted, substantially as described.

7. A stentering machine clip having an upper jaw lever pivoted to the outer side of the frame, a gage tongue jointed to said lever at a point on the outer side of the latter's fulcrum, so as to have an outward movement when the clip is opened, together with an abutment rigid with the clip frame and engaging said gage tongue on its outward movement to cause the same to be lifted, substantially as described.

In testimony whereof I have signed my name to this specification in the presence of two subscribing witnesses.

ALFRED AUSTIN WHITLEY.

Witnesses:

ERNALD SIMPSON MOSELEY,
MALCOLM SMETHURST.

Copies of this patent may be obtained for five cents each, by addressing the "Commissioner of Patents, Washington, D. C."